United States Patent
Piacenza et al.

(10) Patent No.: US 12,145,832 B2
(45) Date of Patent: Nov. 19, 2024

(54) METHOD OF ESTIMATING AN AMOUNT OF LIQUID POURED FROM A CONTAINER, AND AN APPARATUS FOR THE SAME

(71) Applicant: SAMSUNG ELECTRONICS CO., LTD., Suwon-si (KR)

(72) Inventors: Pedro Piacenza, New York City, NY (US); Daewon Lee, Princeton, NJ (US); Daniel Dongyuel Lee, Tenafly, NJ (US); Ibrahim Volkan Isler, St. Paul, MN (US)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 309 days.

(21) Appl. No.: 17/576,108

(22) Filed: Jan. 14, 2022

(65) Prior Publication Data

US 2023/0078623 A1   Mar. 16, 2023

Related U.S. Application Data

(60) Provisional application No. 63/243,541, filed on Sep. 13, 2021.

(51) Int. Cl.
*B67D 3/00*     (2006.01)
*B25J 11/00*    (2006.01)
*B25J 13/08*    (2006.01)

(52) U.S. Cl.
CPC ............. *B67D 3/0003* (2013.01); *B25J 11/00* (2013.01); *B25J 13/084* (2013.01)

(58) Field of Classification Search
CPC ........ B25J 11/00; B25J 13/084; B60D 3/0003
See application file for complete search history.

(56) References Cited

U.S. PATENT DOCUMENTS

2015/0346008 A1* 12/2015 Kisela ................... G01G 17/06
                                                   73/198

OTHER PUBLICATIONS

T. Kiyokawa, M. Ding, G. A. G. Ricardez, J. Takamatsu and T. Ogasawara, "Generation of a Tactile-based Pouring Motion Using Fingertip Force Sensors," 2019 IEEE/SICE International Symposium on System Integration (SII), Paris, France, 2019, pp. 669-674, doi: 10.1109/SII.2019.8700365.*

N. Saito, N. B. Dai, T. Ogata, H. Mori and S. Sugano, "Real-time Liquid Pouring Motion Generation: End-to-End Sensorimotor Coordination for Unknown Liquid Dynamics Trained with Deep Neural Networks," 2019 IEEE International Conference on Robotics and Biomimetics (ROBIO), Dali, China, 2019, pp. 1077-1082, doi: 10.1.*

C. Schenck and D. Fox, "Visual closed-loop control for pouring liquids," 2017 IEEE International Conference on Robotics and Automation (ICRA), Singapore, 2017, pp. 2629-2636, doi: 10.1109/ICRA.2017.7989307.*

(Continued)

*Primary Examiner* — Jason Holloway
*Assistant Examiner* — Blake A Wood
(74) *Attorney, Agent, or Firm* — Sughrue Mion, PLLC

(57) ABSTRACT

A method of estimating an amount of liquid poured from a container includes receiving a tactile signal detected by at least one tactile sensor of an end effector holding the container containing the liquid; receiving a joint signal including an angular position, angular velocity, and torque of a joint connected to the end effector; and estimating, based on the tactile signal and the joint signal, the amount of liquid poured from the container.

8 Claims, 6 Drawing Sheets

(56) References Cited

OTHER PUBLICATIONS

Guevara, Tatiana López, et al. "To stir or not to stir: Online estimation of liquid properties for pouring actions." Robotics: Science and Systems Workshop on Learning and Inference in Robotics: Integrating Structure, Priors and Models. 2018.*

Wu, Tz-Ying, et al. "Liquid pouring monitoring via rich sensory inputs." Proceedings of the European Conference on Computer Vision (ECCV). 2018.*

\* cited by examiner

METHOD OF ESTIMATING AN AMOUNT OF LIQUID POURED FROM A CONTAINER, AND AN APPARATUS FOR THE SAME

CROSS-REFERENCE TO RELATED APPLICATION(S)

This application is based on and claims priority under 35 U.S.C. § 119 to U.S. Provisional Patent Application No. 63/243,541 filed on Sep. 13, 2021, in the U.S. Patent & Trademark Office, the disclosure of which is incorporated by reference herein in its entirety.

BACKGROUND

1. Field

The disclosure relates to a method of estimating an amount of liquid poured from a container using tactile sensors on a robot, such as a robotic arm, and an apparatus for the same.

2. Description of Related Art

Pouring is one of the more common tasks performed in people's daily lives, especially in the context of food preparation, but also for housekeeping, bartending and hospitality services. As service robots begin to be deployed to assist humans in various environments, it is important for robots to be able to accurately pour a specific amount of liquid into a container. Humans often use specialized tools such as a measuring cups or kitchen scales when accuracy is important and even more commonly use vague or relative terms such as pouring "half a cup", asking to "top it off" or "just a little."

Pouring is a challenging task to perform reliably for robots as it is hard to model its dynamics which can be affected by factors such as material properties and geometry of both source and receiving containers. Moreover, the uni-direction nature of the task means that a pouring controller cannot afford to overshoot its target, since once the liquid is poured out of the source container it cannot be recovered.

Robotic pouring using robotic vision requires controlled conditions as containers may be opaque, liquid color varies, background and lightning are not controlled and the camera point of view might be less-than-ideal complicate this method even further.

Moreover, the use of force sensors either at the robot wrist or underneath the receiving container to measure the exact amount of liquid poured through weight measurements. requires equipment to weigh the liquid poured and is not feasible in many circumstances (for example, for a human holding the glass).

SUMMARY

According to an aspect of the disclosure, a method of estimating an amount of liquid poured from a container may include receiving a tactile signal detected by at least one tactile sensor of an end effector holding the container containing the liquid; and estimating, based on the tactile signal, the amount of liquid poured from the container.

According to another aspect of the disclosure, a robotic arm for pouring a predetermined amount of liquid out of a container, the robotic arm may include an end effector comprising at least one tactile sensor configured to provide a tactile signal; a joint connected to the end effector; a motor configured to rotate the joint, the motor comprising a joint sensor configured to provide a joint signal; and a processor configured to: receive the tactile signal; and estimate, based on the tactile signal, an amount of liquid poured from the container.

According to yet another aspect of the disclosure, a non-transitory computer-readable medium may store instructions that, when executed by one or more processors, cause the one or more processors to: receive a tactile signal detected by at least one tactile sensor of an end effector holding a container containing the liquid; and estimate, based on the tactile signal, an amount of liquid poured from the container.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Figure 1:
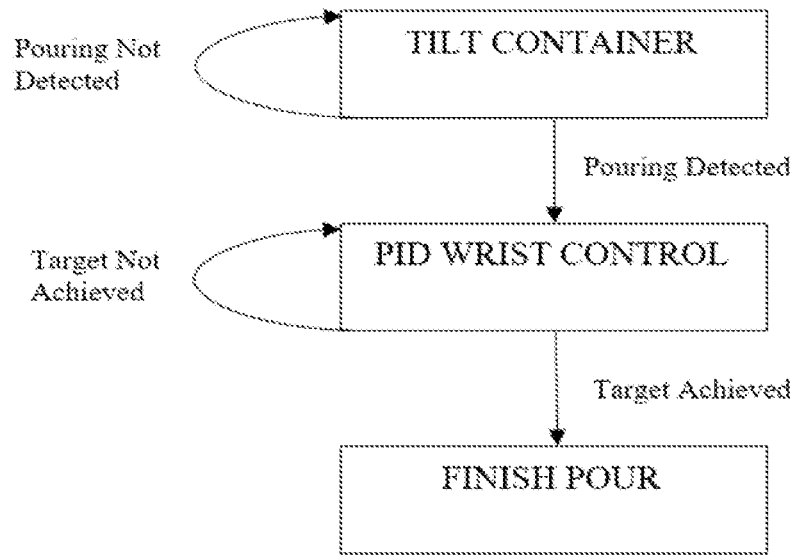
FIG. 1 is a diagram of a state machine of a pouring controller for estimating an amount of liquid poured from a container, according to an embodiment.

FIG. 1 is a diagram of a state machine of a pouring controller for estimating an amount of liquid poured from a container, according to an embodiment. As shown in FIG. 1, a pouring controller may be a finite state machine with three states.

Figure 2:
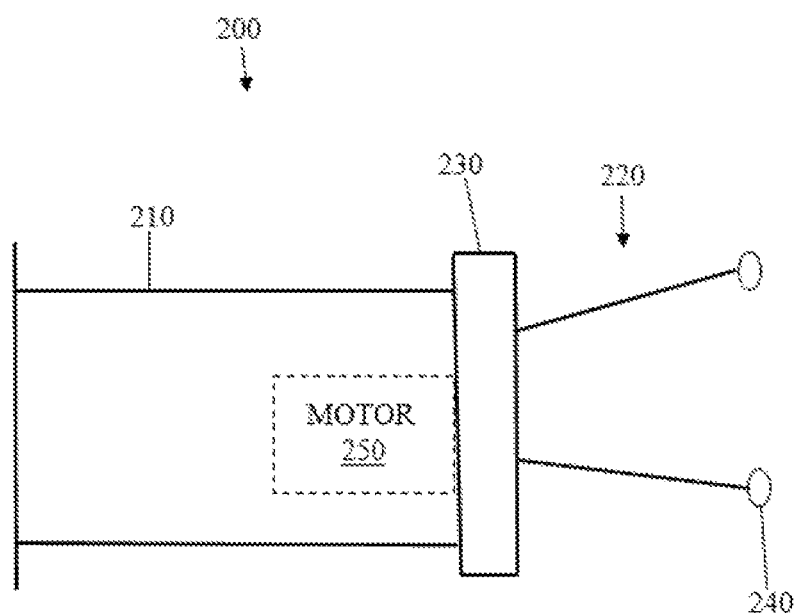
FIG. 2 is a robotic arm for pouring liquid from a container, according to an embodiment.

The method of FIG. 1 may be performed by a robotic arm. As explained more fully herein, embodiments of this disclosure describe a robot that can accurately pour a liquid independent of the environment. A non-limiting embodiment of a robotic arm 200 is shown in FIG. 2. As shown in FIG. 2, the robotic arm may include an arm 210, an end effector 220 capable of picking up a container, and a rotatable joint 230 for rotating the end effector including two digits. A position and an angular velocity of the rotatable joint 230 may be controlled by a motor. The motor 250 may include a sensor which outputs position, angular velocity, and torque of the joint 230.

Tactile sensors 240 may be disposed on the digits of the end effector 220. The tactile sensors 240 may measure a deformation of a skin at the end of the digits of end effector. For example, the tactile sensors may include multiple pairs of electrodes separated by a membrane. When the membrane is deformed, an impedance between the sensors will change, thus producing a signal indicating deformation of the sensor. According to a non-limiting embodiment, the tactile sensors may be BioTac tactile sensors.

The non-limiting embodiment of FIG. 2 is provided as an example for explanation purposes. The robotic arm may include more than one joint, the end effector may include more than two digits, and all or only some of the digits may include tactile sensors.

Prior to the first state, a pouring may begin with the robot in its default resting position. Using pre-programmed waypoints and grasp position, the robot may proceed to grasp, lift, and move a source container to a pouring position above a receiving container. At this point a pouring controller takes over and the pouring motion begins using only the rotation of the robot wrist, while the rest of the arm holds position, as described below with respect to FIG. 1.

As shown in FIG. 1, the first state 110 of the pouring controller may include tilting the source container. The source container may be continuously tilted by rotating the joint until a pour is detected. The pour may be detected based on information provided by tactile sensors and the joint sensor. According to other embodiments, the pour may be detected by a camera or a microphone.

For example, during the first state, a constant velocity may be commanded to a motor 250 that controls movement of the rotatable joint 230. As the joint 230 rotates, a signal from the tactile sensors 240 and joint sensor is monitored to determine when the pouring actually begins. To achieve this, a window of readings may be stored and a first derivative of these measurements may be computed. According to an embodiment, the pouring may be declared as having started once an average value computed over the first derivative exceeds a given threshold.

Once the pouring is detected, a smooth trapezoidal velocity trajectory is built to be used as reference by the pouring controller. This curve may be parametrized by a maximum acceleration and velocity. The maximum velocity determines the desired pouring rate in units of N/s. With this trajectory built, the pouring controller transitions into the second state.

Figure 3:
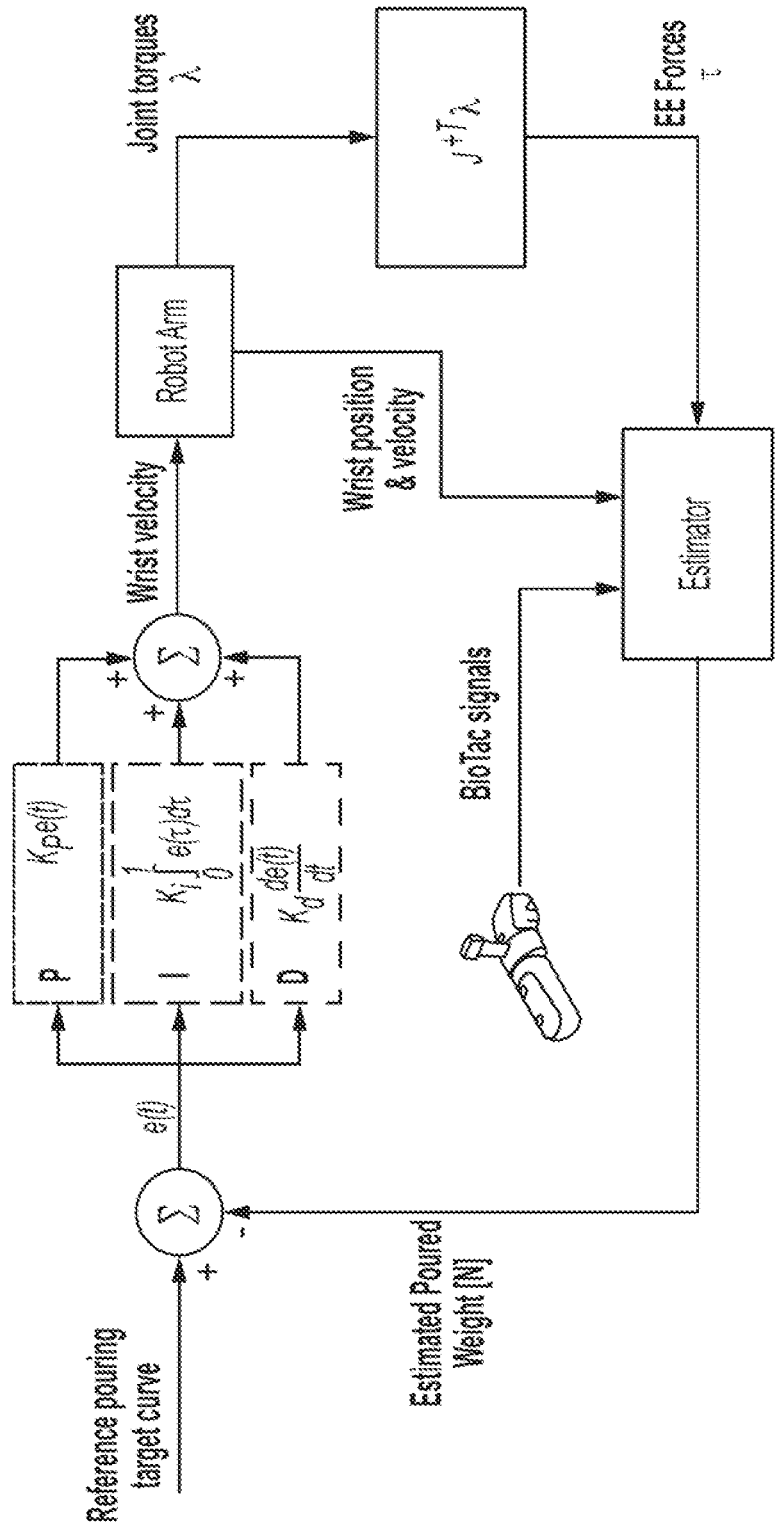
FIG. 3 is a diagram of the PID joint controller and associated feedback loop, according to an embodiment.

Once the pour is detected, a second state 120 of proportional-integral-derivative (PID) joint control may be initiated. FIG. 3 is a diagram of the PID joint controller and associated feedback loop, according to an embodiment. During the second state 120, the PID controller maybe the only actor controlling the velocity of the rotating joint 230.

As shown in FIG. 3, the PID controller may have a feedback loop including an estimator that estimates a poured weight. The estimator may input a vector which includes information provided by the tactile sensors, as well as the joint position, joint velocity, and effector (EE) forces based on joint torque. The estimator and associated vector will be explained in more detail with reference to FIG. 4.

An error value for which the PID controller performs correction may be obtained by calculating a difference between the estimated pour weight, estimated by the estimator, and a reference pouring target curve that is set based on the target amount of liquid to be poured. The error value is input into the PID controller which outputs a rotating joint velocity based on the input error value. At every control iteration, the controller verifies if a target weight has been achieved within a tolerance window.

On the controller detects that the target weight has been achieved within the tolerance window, a third state 130 of finishing the pour is initiated. In the third state, a new trapezoidal velocity trajectory is generated to rotate the rotating joint back so the container is in an upright position.

After completion of the third state, robotic arm may place the container in a predetermined location.

As discussed above, an amount of liquid poured from a container is estimated using only tactile sensors and a joint sensor which outputs joint position, velocity, and torque. Accordingly, the change in weight of the container (amount of liquid poured) is estimated without requiring force sensor in the robotic arm.

A non-limiting example of a pouring process may begin with moving the source container to a pouring position above the receiving container. Once the source container is positioned, baseline measurements are taken from the tactile sensors and computed EE forces based on the joint torque sensor. These baseline measurements are then subtracted from all subsequent measurements. After recording the baseline measurements, data may be logged for a period of time (e.g. 2 seconds) before the controller starts tiling the container.

According to this non-limiting example, data may be logged based on the minimum sampling frequency of all the sensors. For example, if the tactile sensor has the slowest sampling frequency at 100 Hz, the data may be logged at 100 Hz. If the joint positions, velocities and torques from the robot arm are published at 1 Khz, the output of the force sensor may be adjusted to publish at 100 Hz. In the case of the force sensor, only the most recent value which is filtered by the sensor internally with a low pass filter with a cutoff frequency of 1.3 Hz may be logged. The robot arm data and the tactile data, on the other hand, may be stored on a sliding window which represents all measurements over the last 100 ms (equivalent to the latest 100 and 10 measurements for the robot arm and tactile sensors). To reduce noise in both joint torque sensors and tactile sensors, the average computed over this window may be logged. For joint positions and velocities the most recent values may be logged.

Figure 4:
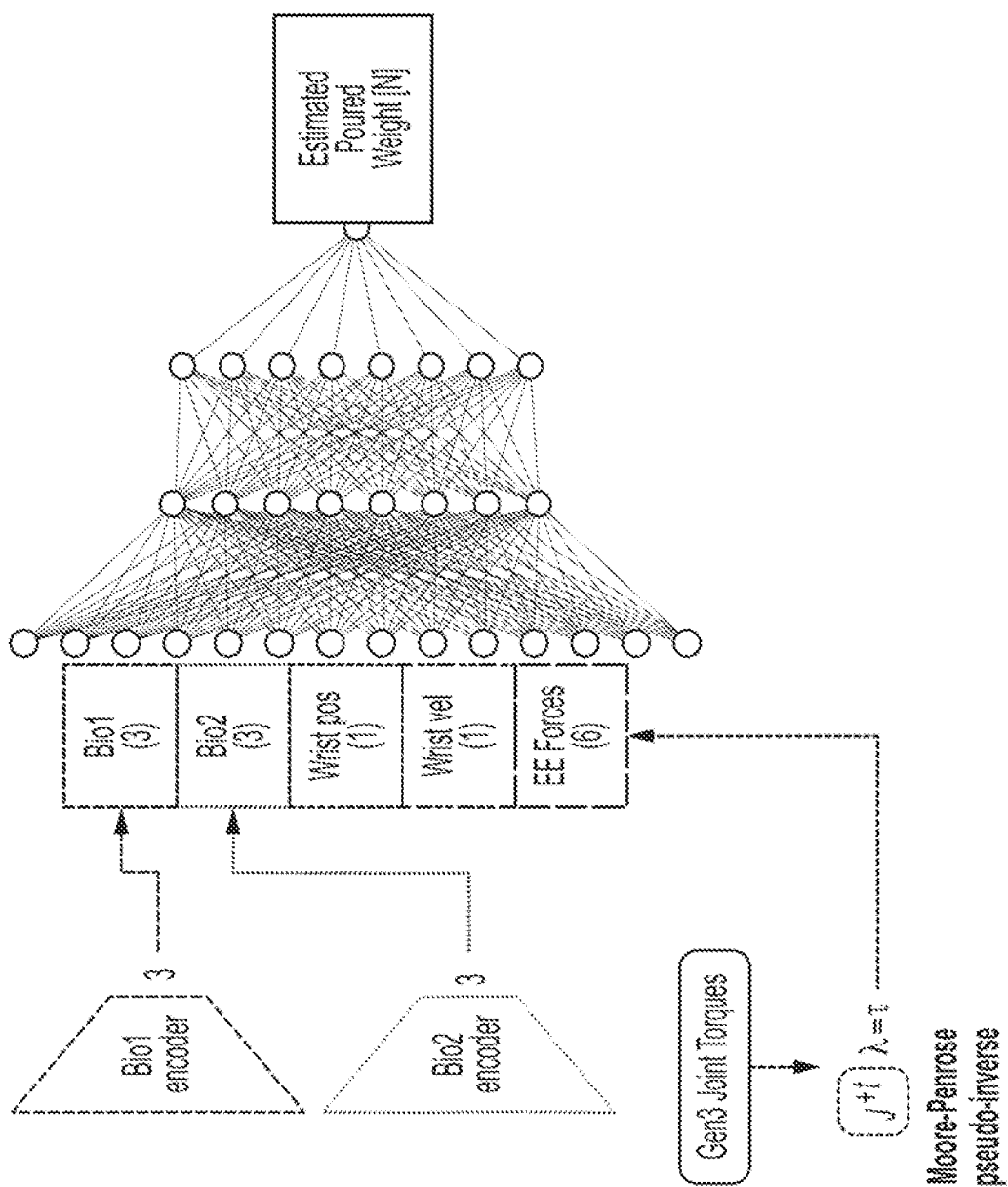
FIG. 4 is a diagram of the estimator used for estimate an amount of liquid poured from the container, according to an embodiment.

FIG. 4 is a diagram of the estimator used to estimate an amount of liquid poured from the container, according to an embodiment.

As shown in FIG. 4, the estimator may include a neural network 420 that inputs a vector 410 including data from the tactile sensors and joint sensor. According to an embodiment, the neural network may be a fully connected, multi-layer perception (MLP) neural network. The neural network may use a rectified linear unit (ReLU) activation function except on the output layer which uses a linear transfer function.

As shown in the upper two blocks of the vector 410, the outputs from each tactile sensor may be encoded to obtain a smaller dimensional representation of the data for generating the vector 410. According to an non-limiting embodiment where the tactile sensors output 19 signals, the encoder may consist of a single layer with a ReLU activation function which takes in all 19 signals and outputs a vector of 3 dimensions. Each encoder may be trained independently and therefore each encoder may have different weights.

The vector 410 may also include an absolute value of wrist position and wrist velocity.

The vector 410 may also include an EE forces vector which includes the forces that are felt at the rotating joint of the robot arm. The EE forces vector may be a six dimensional vector that includes forces in the x, y, and z plane and torques in the x, y, and z plane, where the coordinate planes are based on the base of the robot arm.

The forces at the end effector in the base coordinates can be computed from the joint torque using the Jacobian transpose formulation shown below in Equation 1.

$$\lambda = J^t \tau \quad \text{[Equation 1]}$$

In Equation 1, $\lambda$ represents the joint torque value, $J^t$ represent the Jacobian transpose, and $\tau$ represented the forces applied at the end effector. As such, the forces applied at the end effector can be obtained using the Moore-Penrose pseudo inverse shown below in Equation 2.

$$\tau = J^{+t} \lambda \quad \text{[Equation 2]}$$

A change in the Force vector in the z plane can be used to indicate a change in weight of the end effector. The above formulation assumes the manipulator is in static equilibrium, so the output is only an approximation that is input into the neural network for a more accurate estimate of the change in weight.

To obtain the vector 410, the encoded tactile signals may be concatenated with the EE forces and the rotating joint position and velocity.

The loss function used to train the neural network may be the mean square error (MSE) between the estimated value and a ground truth. To compute this ground truth, a signal from a force sensor under the receiving container may be adjusted to represent how much weight has left the source container, instead of how much weight has arrived at the receiving container. From the geometry of the source container, the grasp position, and the joint angles, the exact distance from the spout of the source container to the receiving container can be calculated at all given times. Using the calculated distance, the time it takes for the liquid to travel this distance can be calculated using a simple free fall model with zero initial velocity. To obtain our ground truth signal, the recorded data from the force sensor is shifted based on the calculated time.

Figure 5:
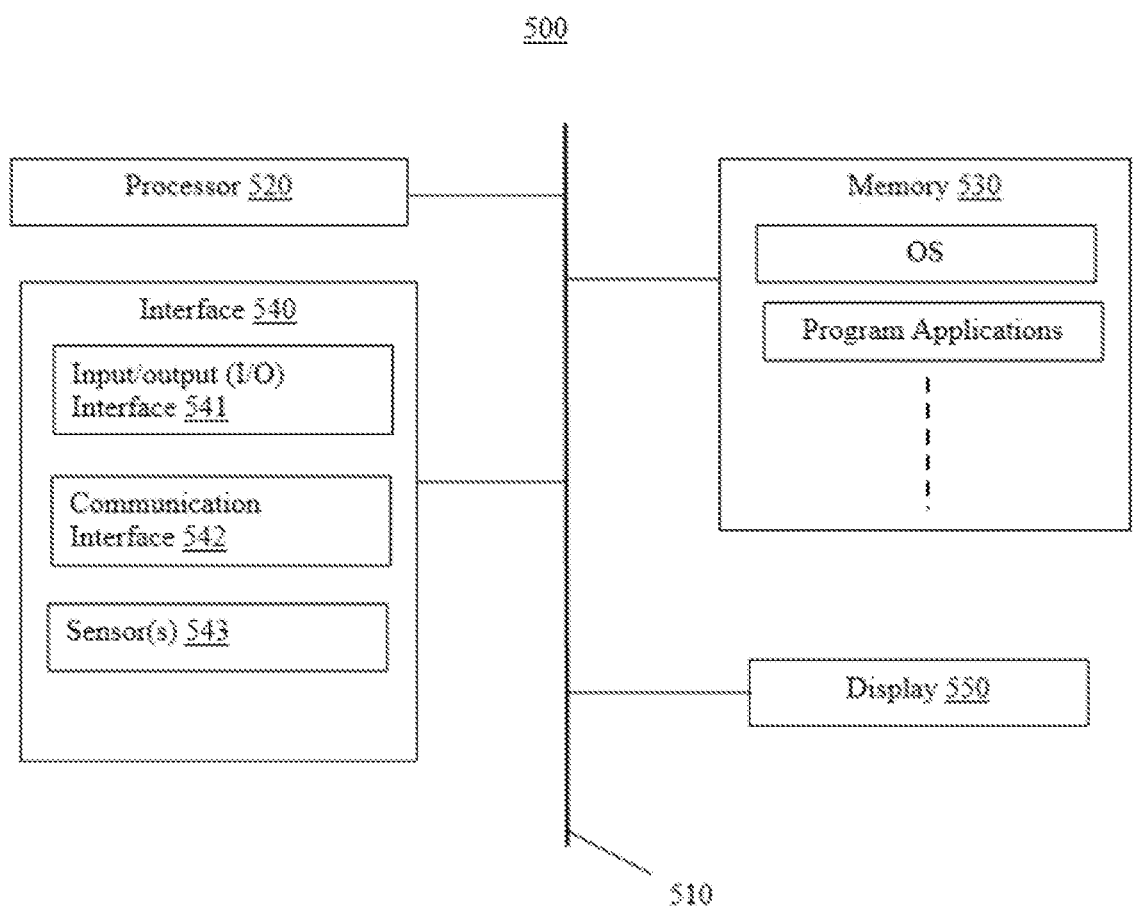
FIG. 5 is hardware diagram of an electronic device for controlling a pouring process, according to an embodiment.
Figure 6:
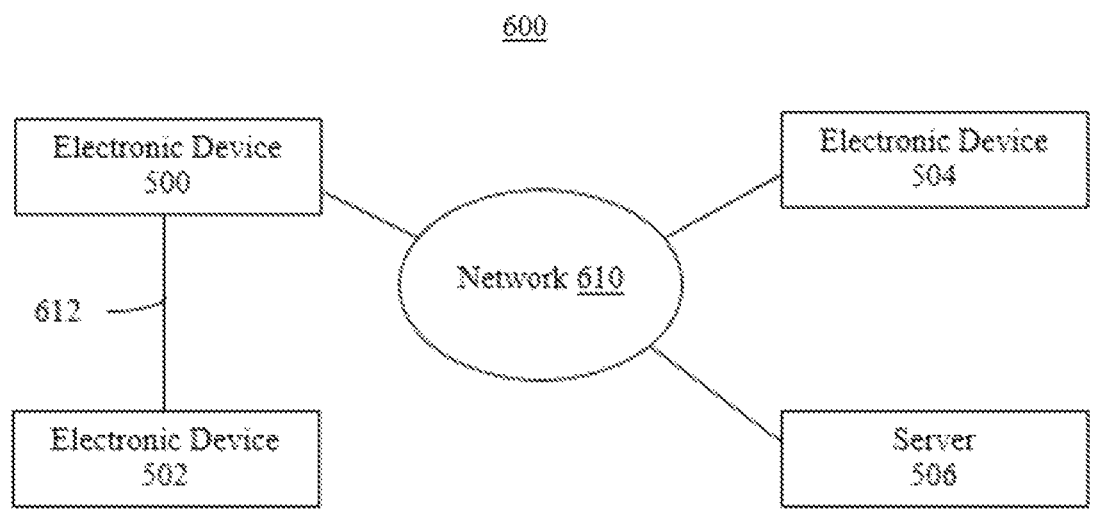
FIG. 6 is diagram of a network used for controlling a pouring process, according to an embodiment.

The controlling of the pouring process may be performed by electronic device 500 of FIG. 5, in a network environment 600 as shown in FIG. 6, according to an embodiment. FIGS. 5 and 6 are for illustration only, and other embodiments of the electronic device and network could be used without departing from the scope of this disclosure.

As shown in FIG. 5 electronic device 500 includes at least one of a bus 510, a processor 520 (or a plurality of processors), a memory 530, an interface 540, or a display 550.

Bus 510 may include a circuit for connecting the components 520, 530, 540, and 550 with one another. Bus 510 may function as a communication system for transferring data between the components, or between electronic devices.

Processor 520 may include one or more of a central processing unit (CPU), a graphics processor unit (GPU), an accelerated processing unit (APU), many integrated core (MIC), a field-programmable gate array (FPGA), or a digital signal processing (DSP). Processor 520 may control at least one of other components of electronic device 500, and/or perform an operation or data processing relating to communication. Processor 520 may execute one or more programs stored in memory 530.

Memory 530 may include a volatile and/or a non-volatile memory. Memory 530 may store information, such as one or more commands, data, programs (one or more instructions), or applications, etc., that is related to at least one other component of the electronic device 500 and for driving and controlling electronic device 500. For example, commands or data may formulate an operating system (OS). Information stored in memory 530 may be executed by processor 520.

The application may include one or more embodiments as discussed above. These functions can be performed by a single application or by multiple applications that each carry out one or more of these functions.

Display 550 may include, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. Display 550 can also be a depth-aware display, such as a multi-focal display. Display 550 is able to present, for example, various contents (such as text, images, videos, icons, or symbols).

Interface 540 may include input/output (I/O) interface 541, communication interface 542, and/or one or more sensors 543. I/O interface 541 serves as an interface that can, for example, transfer commands or data between a user or other external devices and other component(s) of electronic device 500.

Sensor(s) 543 may meter a physical quantity or detect an activation state of electronic device 500 and may convert metered or detected information into an electrical signal. For example, sensor(s) 543 may include one or more cameras or other imaging sensors for capturing images of scenes. The sensor(s) 543 may also include a microphone, a keyboard, a mouse, one or more buttons for touch input, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (EGG) sensor, an infrared (IR) sensor, an ultrasound sensor, an iris sensor, or a fingerprint sensor. The sensor(s) 543 can further include an inertial measurement unit. In addition, sensor(s) 543 can include a control circuit for controlling at least one of the sensors included here. Any of these sensor(s) 543 can be located within or coupled to electronic device 500. Sensor(s) 543 may be used to detect touch input, gesture input, hovering input using an electronic pen or a body portion of a user, etc.

Communication interface 542, for example, may be able to set up communication between electronic device 500 and an external electronic device (such as a first electronic device 502, a second electronic device 504, or a server 506 as shown in FIG. 6). As shown in FIG. 6, communication interface 542 may be connected with a network 610 and/or 612 through wireless or wired communication architecture to communicate with an external electronic device. Communication interface 142 may be a wired or wireless transceiver or any other component for transmitting and receiving signals.

FIG. 6 shows an example network configuration 600 according to an embodiment. Electronic device 500 of FIG. 5 may be connected with a first external electronic device 502, a second external electronic device 504, or a server 506 through network 610 and/or 612. Electronic device 500 may be wearable device, an electronic device-mountable wearable device (such as an FIMD), etc. When electronic device 500 is mounted in the electronic device 502 (such as the FIMD), electronic device 500 may communicate with electronic device 502 through communication interface 542. Electronic device 500 may be directly connected with electronic device 502 to communicate with electronic device 502 without involving a separate network. Electronic device 500 may also be an augmented reality wearable device, such as eyeglasses, that include one or more cameras.

The first and second external electronic devices 502 and 504 and server 506 may each be a device of a same or a different type than electronic device 500. According to some embodiments, server 506 may include a group of one or more servers. Also, according to some embodiments, all or some of the operations executed on electronic device 500 may be executed on another or multiple other electronic devices (such as electronic devices 502 and 504 or server 506). Further, according to some embodiments, when electronic device 500 should perform some function or service automatically or at a request, electronic device 500, instead of executing the function or service on its own or additionally, can request another device (such as electronic devices 502 and 504 or server 506) to perform at least some functions associated therewith. The other electronic device (such as electronic devices 502 and 504 or server 506) may be able to execute the requested functions or additional functions and transfer a result of the execution to electronic device 500. Electronic device 500 can provide a requested function or service by processing the received result as it is or additionally. To that end, a cloud computing, distributed computing, or client-server computing technique may be used, for example. While FIGS. 5 and 6 show that electronic device 500 including communication interface 542 to communicate with external electronic devices 502 and 504 or server 506 via the network 610 or 612, electronic device 500 may be independently operated without a separate communication function according to some embodiments.

Server 506 may include the same or similar components 510, 520, 530, 540, and 550 as electronic device 500 (or a suitable subset thereof). Server 506 may support driving electronic device 500 by performing at least one of operations (or functions) implemented on electronic device 500. For example, server 506 can include a processing module or processor that may support processor 520 of electronic device 500.

The wireless communication may be able to use at least one of, for example, long term evolution (LTE), long term evolution-advanced (LTE-A), 5th generation wireless system (5G), millimeter-wave or 60 GFIz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection may include, for example, at least one of a universal serial bus (USB), high definition multimedia interface (HDMI), recommended standard 232 (RS-232), or plain old telephone service (POTS). The network 610 or 612 includes at least one communication network, such as a computer network (like a local area network (LAN) or wide area network (WAN)), Internet, or a telephone network.

Although FIG. 6 shows one example of a network configuration 600 including an electronic device 500, two external electronic devices 502 and 504, and a server 506, various changes may be made to FIG. 6. For example, the network configuration 500 could include any number of each component in any suitable arrangement. In general, computing and communication systems come in a wide variety of configurations, and FIG. 5 does not limit the scope of this disclosure to any particular configuration. Also, while FIG. 5 shows one operational environment in which various features disclosed in this patent document can be used, these features could be used in any other suitable system.

The forecasting method may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 500, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The instruction for controlling the pouring process may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 506.

Figure 7:
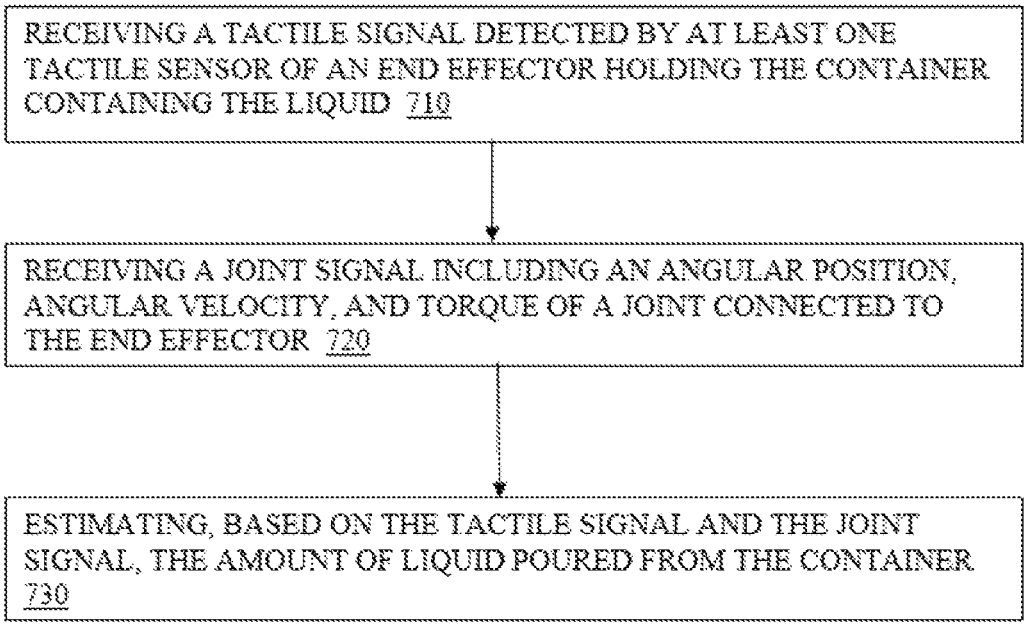
FIG. 7 is a flowchart of a method 700 of estimating an amount of liquid poured from a container, according to an embodiment.

FIG. 7 is a flowchart of a method 700 of estimating an amount of liquid poured from a container, according to an embodiment.

In operation 710, a tactile signal detected by at least one tactile sensor of an end effector holding the container containing the liquid may be received.

In operation 720, a joint signal including an angular position, angular velocity, and torque of a joint connected to the end effector may be received.

In operation 730, the amount of liquid poured from the container may be estimated based on the tactile signal and the joint signal. The estimating the amount of liquid poured from the container may include inputting a feature vector based on the tactile signal and the joint signal into a neural network. Forces at the end effector may be determined based on the torque of the joint. The feature vector may be obtained by concatenating the tactile signal with the angular position of the joint, the angular velocity of the joint, and forces at the end effector.

The end effector may be controlled to pour the liquid based on the estimated amount of liquid that has been poured from the container using a proportional-integral-derivative (PID) controller. An error value for which the PID controller performs correction may be obtained by calculating a difference between a target amount of liquid to be poured and the estimated amount of liquid that has been poured.

The end effector may be controlled to rotate the container in a first direction and detect a pour from the container. The controlling the end effector to pour the liquid based on the estimated amount of liquid that has been poured from the container may be initiated after the pour is detected.

The end effector may be controlled to rotate in a second direction opposite to the first direction in response to the estimated amount of liquid that has been poured from the container reaching the target amount of liquid to be poured from the container.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method of a robotic arm for estimating an amount of liquid poured from a container, the method comprising:
   receiving a tactile signal detected by at least one tactile sensor of an end effector holding the container containing a liquid;
   receiving a joint signal including an angular position, angular velocity, and torque of a joint connected to the end effector;
   estimating, based on the tactile signal and the joint signal, the amount of liquid poured from the container;
   determining forces at the end effector based on the torque of the joint; and
   controlling the end effector to pour the liquid, using a proportional-integral-derivative (PID) controller, based on the estimated amount of liquid that has been poured from the container,
   wherein the estimating the amount of liquid poured from the container comprises inputting a feature vector based on the tactile signal and the joint signal into a neural network,
   wherein the feature vector is obtained by concatenating the tactile signal with the angular position of the joint, the angular velocity of the joint, and forces at the end effector,
   wherein an error value for which the PID controller performs correction is obtained by calculating a difference between a target amount of liquid to be poured and the estimated amount of liquid that has been poured.

2. The method of claim 1, further comprising controlling the end effector to rotate the container in a first direction and detecting a pour from the container,
   wherein the controlling the end effector to pour the liquid based on the estimated amount of liquid that has been poured from the container is initiated after the pour is detected.

3. The method of claim 2, further comprising, in response to the estimated amount of liquid that has been poured from the container reaching the target amount of liquid to be poured from the container, controlling the end effector to rotate in a second direction opposite to the first direction.

4. A robotic arm for pouring a predetermined amount of liquid out of a container, the robotic arm comprising:
   an end effector comprising at least one tactile sensor configured to provide a tactile signal;
   a joint connected to the end effector;
   a motor configured to rotate the joint, the motor comprising a joint sensor configured to provide a joint signal; and
   a processor configured to:
      receive the tactile signal;
      receive the joint signal including an angular position, angular velocity, and torque of the joint connected to the end effector;
      estimate, based on the tactile signal and the joint signal, an amount of liquid poured from the container;
      determine forces at the end effector based on the torque of the joint; and
      control the end effector to pour a liquid, using a proportional-integral-derivative PID) controller, based on the estimated amount of the liquid that has been poured from the container, wherein the estimating the amount of liquid poured from the container comprises inputting a feature vector based on the tactile signal and the joint signal into a neural network, wherein the feature vector is obtained by concatenating the tactile signal with the angular position of the joint, the angular velocity of the joint, and forces at the end effector, wherein an error value for which the PID controller performs correction is obtained by calculating a difference between a target amount of liquid to be poured and the estimated amount of liquid that has been poured.

5. The robotic arm of claim 4, wherein the processor is further configured to control the joint to rotate the container in a first direction and detect a pour from the container, and wherein the controlling the joint to pour the liquid based on the estimated amount of liquid that has been poured from the container is initiated after the pour is detected.

6. The robotic arm of claim 5, wherein the processor is further configured to, in response to the estimated amount of liquid that has been poured from the container reaching the target amount of liquid to be poured from the container, control the joint to rotate in a second direction opposite to the first direction.

7. A non-transitory computer-readable medium storing instructions, the instructions comprising: one or more instructions that, when executed by one or more processors, cause the one or more processors to:

receive a tactile signal detected by at least one tactile sensor of an end effector holding a container containing a liquid;

receive a joint signal including an angular position, angular velocity, and torque of a joint connected to the end effector;

estimate, based on the tactile signal and the joint signal, an amount of liquid poured from the container;

determine forces at the end effector based on the torque of the joint; and control the end effector to pour the liquid, using a proportional-integral-derivative (PID) controller, based on the estimated amount of liquid that has been poured from the container, wherein the estimating the amount of liquid poured from the container comprises inputting a feature vector based on the tactile signal and the joint signal into a neural network, wherein the feature vector is obtained by concatenating the tactile signal with the angular position of the joint, the angular velocity of the joint, and forces at the end effector, wherein an error value for which the PID controller performs correction is obtained by calculating a difference between a target amount of liquid to be poured and the estimated amount of liquid that has been poured.

8. The non-transitory computer-readable medium of claim 7, wherein the one or more instructions cause the one or more processors to:

control the joint to rotate the container in a first direction and detect a pour from the container; and control, in response to the estimated amount of liquid that has been poured from the container reaching the target amount of liquid to be poured from the container, the joint to rotate in a second direction opposite to the first direction, wherein the controlling the joint to pour the liquid based on the estimated amount of liquid that has been poured from the container is initiated after the pour is detected.

* * * * *